United States Patent
Anderson et al.

(10) Patent No.: US 7,597,168 B2
(45) Date of Patent: Oct. 6, 2009

(54) LOW ENGINE SPEED STEERING PERFORMANCE

(75) Inventors: Eric R. Anderson, Galena, IL (US); Benjamin Nedved, Asbury, IA (US); Jarko Malinen, Ylämylly (FI); Daniel L. Pflieger, East Dubuque, IL (US)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 11/438,828

(22) Filed: May 23, 2006

(65) Prior Publication Data

US 2007/0068724 A1    Mar. 29, 2007

Related U.S. Application Data

(60) Provisional application No. 60/719,912, filed on Sep. 23, 2005.

(51) Int. Cl.
*B60K 17/354* (2006.01)
*B60K 17/344* (2006.01)
*F16D 31/02* (2006.01)

(52) U.S. Cl. ............ 180/247; 180/418; 180/233; 180/248; 180/197; 701/69; 60/428; 60/486; 60/403

(58) Field of Classification Search ......... 180/247, 180/418, 417, 421, 441, 442; 60/428, 486, 60/403
See application file for complete search history.

(56) References Cited

U.S. PATENT DOCUMENTS

| | | | |
|---|---|---|---|
| 4,116,001 A | 9/1978 | Orth | |
| 4,354,420 A * | 10/1982 | Bianchetta | 91/6 |
| 4,463,558 A | 8/1984 | Miller et al. | |
| 4,541,451 A | 9/1985 | Wittren et al. | |
| 4,556,078 A | 12/1985 | Wittren | |
| 4,625,751 A | 12/1986 | Gage | |
| 4,723,475 A | 2/1988 | Burk | |
| 4,781,219 A | 11/1988 | Haarstad et al. | |
| 4,809,586 A | 3/1989 | Gage et al. | |
| 4,915,186 A * | 4/1990 | Gage | 180/403 |
| 5,024,140 A * | 6/1991 | Gage | 91/28 |
| 5,050,696 A * | 9/1991 | McGovern et al. | 180/406 |
| 5,355,675 A * | 10/1994 | Mayhugh et al. | 60/327 |
| 6,209,677 B1 * | 4/2001 | Bohner et al. | 180/406 |
| 7,200,993 B2 * | 4/2007 | Khalil et al. | 60/403 |
| 7,451,686 B2 * | 11/2008 | Graeve et al. | 91/516 |

OTHER PUBLICATIONS

John Deere, Loaders, 724J/744J/824J, May 2002, 32 pgs.
Hydraforce, EP20-S35 Piloted Spool-Type Logic Element, Directional Valves, pp. 4.503.1-4.503.2.
Hydraforce, Directional Valves, Piloted Logic Elements, 1 page.

* cited by examiner

*Primary Examiner*—Lesley D. Morris
*Assistant Examiner*—Marlon A Arce
(74) *Attorney, Agent, or Firm*—Baker & Daniels LLP

(57) ABSTRACT

A hydraulic system for a work vehicle including a manifold assembly configured to prioritize hydraulic fluid flow to priority functions over a wide range of engine speeds.

21 Claims, 5 Drawing Sheets

LOW ENGINE SPEED STEERING PERFORMANCE

CROSS-REFERENCE TO RELATED APPLICATION

This application claims priority to U.S. Provisional Application Ser. No. 60/719,912, filed Sep. 23, 2005, the disclosure of which is expressly incorporated by reference herein.

FIELD OF THE INVENTION

The present invention relates generally to a hydraulic control system for a work vehicle. More particularly, the present invention relates to a hydraulic control system which effectively prioritizes steering functions over auxiliary functions across a wide range of engine speeds.

BACKGROUND AND SUMMARY OF THE INVENTION

Many work vehicles use hydraulics to control certain functions performed by the vehicle. For example, many work vehicles, such as four wheel drive articulated loaders, use hydraulics to control a variety of functions, such as steering, loading, and braking. Many such work vehicles utilize load sensing systems. A load sensing system varies the pump flow and fluid pressure to meet a load requirement and has one hydraulic function which has preference over other hydraulic functions. For example, the steering function of vehicle may have priority over the hydraulic function which controls the movement of an attachment bucket. In such load sensing systems, a priority valve is typically used to assure that the priority function, such as steering, always has available fluid. Such systems are typically sized such that the required flow for the priority function, such as maximum steering, is not met until mid throttle of the engine. This often results in poor steering performance at low idle of the engine.

According to an illustrative embodiment of the disclosure, a vehicle includes an articulated frame having a front portion and a rear portion, and a plurality of traction devices configured to propel the frame on the ground. A steering assembly includes a hydraulic steering actuator operably coupled to the front portion and the rear portion of the frame. A loader assembly includes a hydraulic loader actuator supported by the frame. A priority pump is in fluid communication with the steering assembly. A first compensator valve is in fluid communication with the priority pump, and a second compensator valve is in fluid communication with the priority pump and is coupled in parallel with the first compensator valve. The first compensator valve and the second compensator valve are configured to provide fluid flow from the priority pump to the loader assembly only when fluid pressure from the pump exceeds a predetermined value.

According to a further illustrative embodiment of the disclosure, a vehicle includes an articulated frame having a front portion and a rear portion, and a plurality of traction devices configured to propel the frame on the ground. A control system includes a pump, at least one hydraulic steering actuator operably coupled to the front portion and the rear portion of the frame, and a steering valve configured to place the at least one hydraulic steering actuator in fluid communication with the pump. A first compensator valve is configured to control the flow of fluid from the pump to the steering valve by providing priority to the flow of fluid to the at least one hydraulic steering actuator. A pressure regulating valve is positioned intermediate the compensator valve and the steering valve, and is configured to regulate the pressure of fluid supplied to the steering valve.

According to another illustrative embodiment of the disclosure, a vehicle includes an articulated frame having a front portion and a rear portion, and a plurality of traction devices configured to propel the frame on the ground. A steering assembly includes a hydraulic steering actuator operably coupled to the front portion and the rear portion of the frame, and a steering valve fluidly coupled to the steering actuator. A loader assembly includes at least one loader actuator supported by the frame, and a loader valve fluidly coupled to the loader actuator. A priority pump is in fluid communication with the steering assembly. A first compensator valve is in fluid communication with the priority pump, and a second compensator valve in fluid communication with the priority pump and is coupled in parallel with the first compensator valve. A pressure regulating valve is positioned intermediate the first and second compensator valves and the steering valve. The pressure regulating valve is configured to regulate the pressure of fluid supplied to the steering valve. A load signal line is fluidly coupled to the steering assembly and is configured to transmit load pressure signals, generated by loads acting on the hydraulic steering actuator, to the first and second compensator valves. The first and second compensator valves are configured to sense a pressure differential between the fluid discharged from the priority pump and the fluid present in the load signal line, and to control fluid flow to the loader assembly in response to the pressure differential.

According to yet another illustrative embodiment, a vehicle includes an articulated frame having a front portion and a rear portion, and a plurality of traction devices configured to support the frame on the ground. A primary work circuit includes a hydraulic steering actuator operably coupled to the front portion and the rear portion of the frame. A secondary work circuit includes a hydraulic actuator supported by the frame. A pump is in fluid communication with the primary work circuit and is configured to supply a fluid flow. An engine is operably coupled to the pump and has an operating speed ranging from at least low engine speed to full throttle engine speed, the fluid flow varying based upon the operating speed of the engine. A manifold is in fluid communication with the pump and is configured to selectively provide fluid flow to the primary work circuit and the secondary work circuit based upon engine operating speed, such that the primary work circuit is supplied with adequate fluid flow to ensure full performance of the hydraulic steering actuator from low engine speed to full throttle engine speed.

DETAILED DESCRIPTION OF THE DRAWINGS

Figure 1:
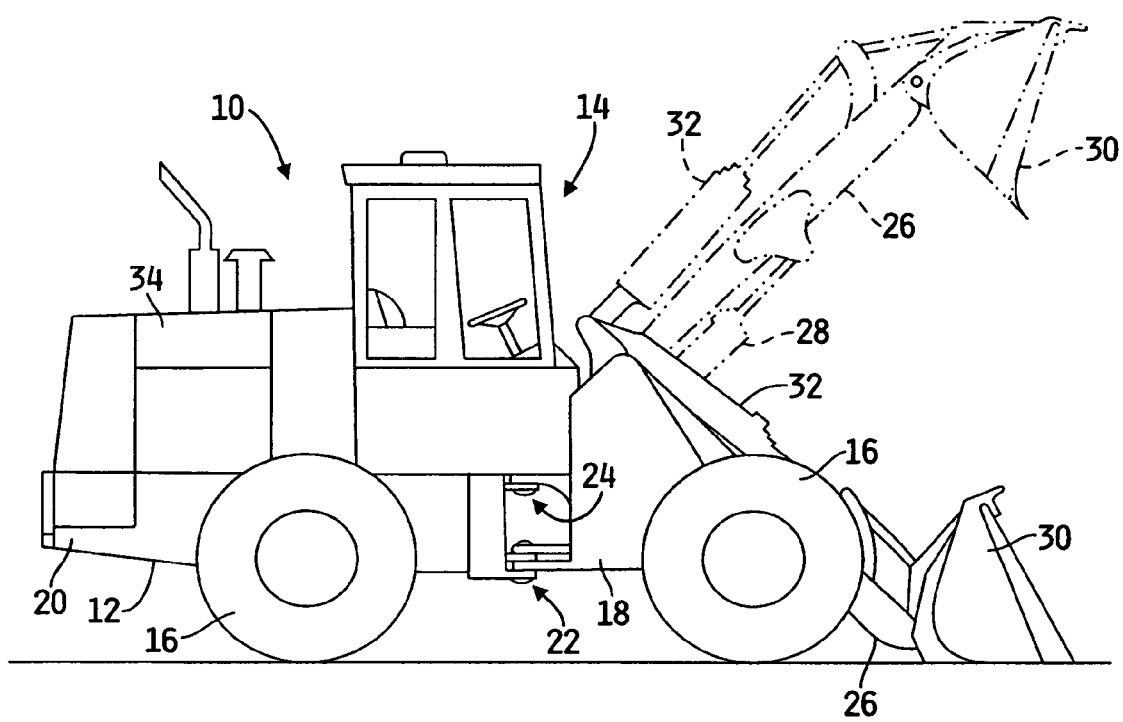
FIG. 1 is a side elevation view of an articulated loader.

Referring initially to FIG. 1, an articulated loader 10 is shown for moving loose materials such as rock, dirt, sand, gravel, coal, and other materials. The loader 10 includes an articulated frame 12, a passenger cab 14, and a plurality of traction devices, illustratively wheels 16, to support the frame 12. The frame 12 includes a front portion 18 and a back portion 20 that is pivotally coupled to the back portion 20 through vertical pivots 22 and 24. A boom 26 is pivotally supported by the front portion 18 and is configured to be lifted by boom hydraulic actuators or cylinders 28. A bucket 30 is pivotally supported by the boom 26 and is configured to be pivoted by bucket hydraulic actuators or cylinders 32.

The loader 10 includes a hydraulic system 100 having a steering assembly 200 (FIG. 4) which is configured to assist in articulating, or steering, the front portion 18 relative to the back portion 20. The loader 10 is driven in motion by an internal combustion engine 34, which also drives hydraulic pumps 102, 104, and 106 of hydraulic system 100. As is known, the fluid output of the pumps 102, 104, and 106 varies based upon the operating speed of the engine 34, which may range from low engine speed to full throttle engine speed.

Figure 3:
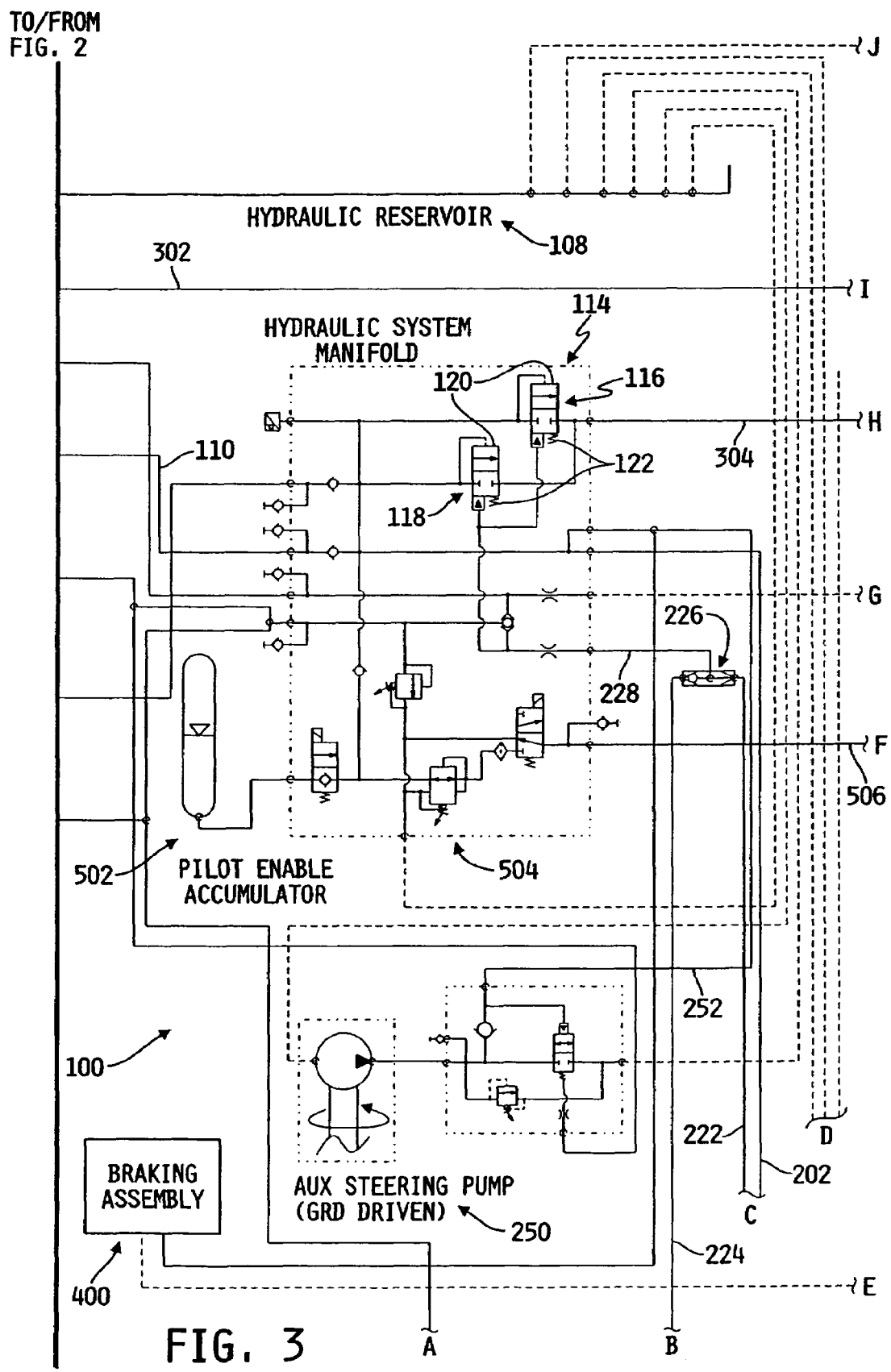
FIG. 3 is a schematic view of another portion of the hydraulic control system continued from FIG. 2, showing a priority manifold, a pilot enable accumulator, a pilot pressure regulating assembly, an auxiliary steering pump, and a braking assembly.
Figure 4:
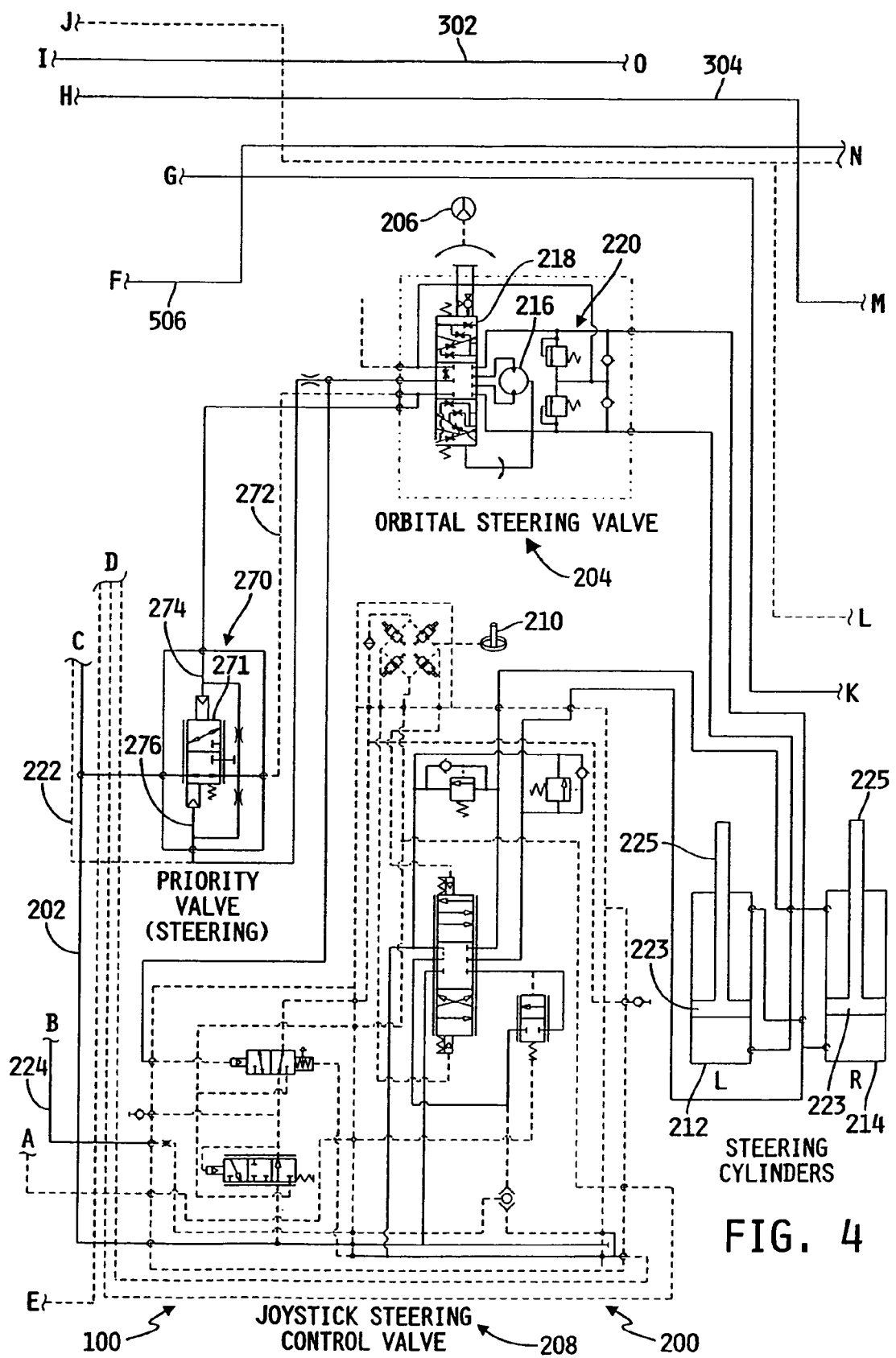
FIG. 4 is a schematic view of another portion of the hydraulic control system continued from FIG. 3, showing a steering system.
Figure 5:
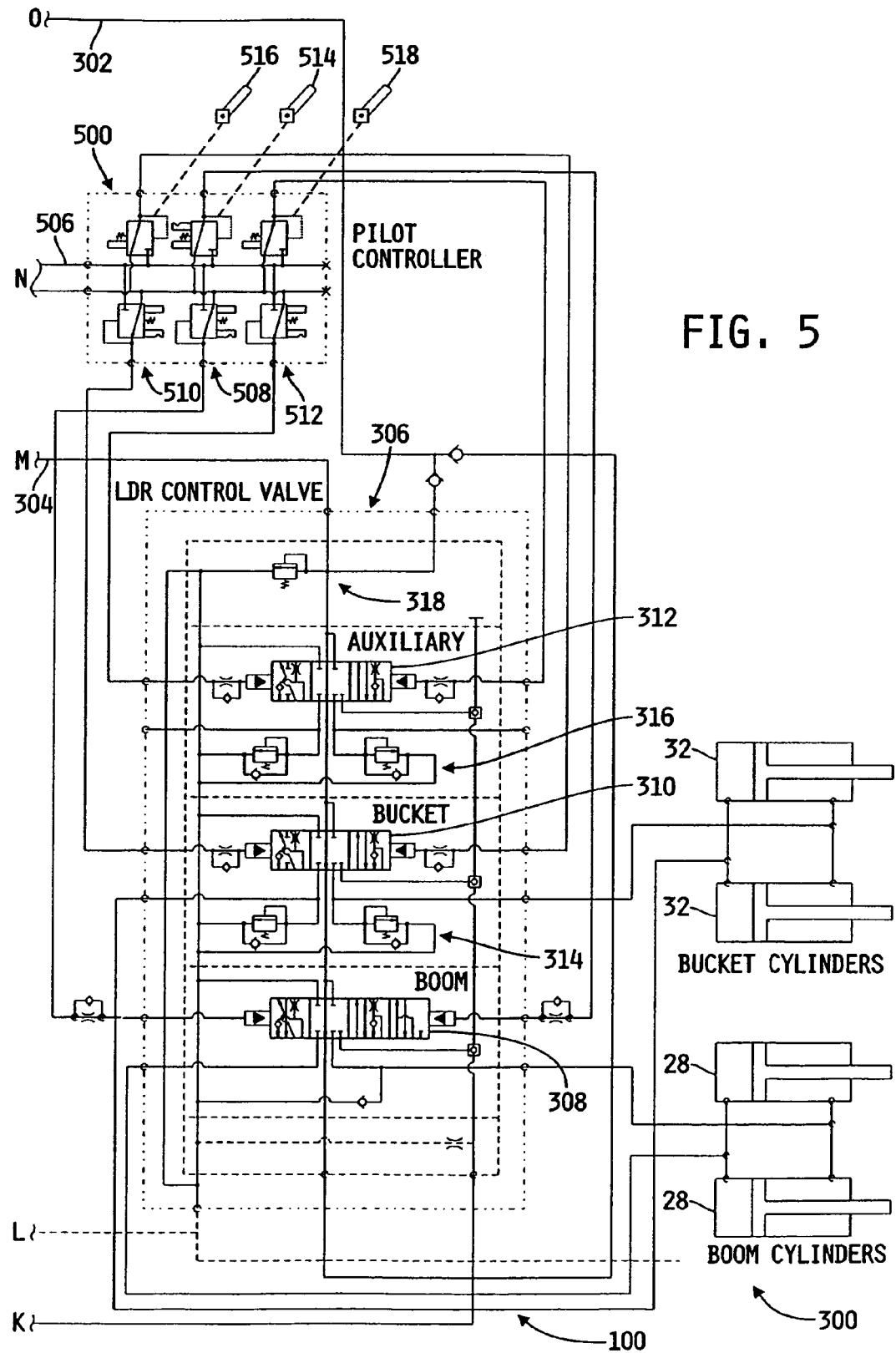
FIG. 5 is a schematic view of another portion of the hydraulic control system continued from FIG. 4, showing a pilot controller, and a loader assembly.

Hydraulic system 100 is shown schematically in FIGS. 2-5 as including a reservoir 108 which is fluidly connected to variable displacement pumps, including first and second primary function or priority pumps 102 and 104, and a secondary function or loader pump 106. The primary function pumps 102 and 104 supply pressurized fluid through supply lines 110 and 112, respectively, to a hydraulic system, or priority, manifold 114. Hydraulic system manifold 114 prioritizes the functions of hydraulic system 100 and subsequently provides fluid to priority function(s), such as steering assembly 200, and if sufficient fluid is available, to secondary functions, such as a loader assembly 300 (FIG. 5).

More particularly, hydraulic system 100 is designed such that a primary work circuit has priority over secondary work circuits. In the illustrative embodiment, the primary work circuit is shown as steering assembly 200, and the secondary work circuit is shown as loader assembly 300. It should be appreciated that the primary work circuit and the secondary work circuit could comprise other hydraulic circuits. For example, the priority work circuit could comprise a braking assembly 400 (FIG. 3).

The manifold 114 includes first and second compensator valves 116 and 118 which are positioned downstream from the primary pumps 102 and 104, and are fluidly coupled thereto through lines 110 and 112. Compensator valves 116 and 118 are arranged in parallel such that additional compensator valves may be readily added thereto if additional flow capacity is desired. For example, a third compensator valve (not shown) could be fluidly connected in parallel to both the first and second compensator valves 116 and 118 to increase flow capacity. Similarly, a third priority pump (not shown) could be added to the hydraulic system 100 to provide additional capacity to the steering system 200.

The compensator valves 116 and 118 are configured to give priority to the steering assembly 200, shutting off fluid to the loader assembly 300 in response to fluid demands of the steering assembly 200. As such, the manifold 114 provides priority to steering functions over a wide variety of operating speeds of engine 34, particularly at low speeds, such as idle, when fluid supplied from the pumps 102 and 104 is more limited. In other words, the manifold 114 is configured to provide full performance of the steering assembly 200 from low engine speeds up to wide open throttle engine speeds. The compensator valves 116 and 118 illustratively comprise a spring biased two-way, two-position valve having a spool 120 that selectively directs fluid between the steering assembly 200 and the loader assembly 300. Illustratively, the compensator valves 116 and 118 are biased by a spring 122 towards a closed position, wherein the fluid flow through the supply lines 110 and 112 is restricted or blocked from the loader assembly 300. The spools 120 of compensator valves 116 and 118 are moveable by the fluid pressure in the supply lines 110 and 112 to an open position wherein fluid is allowed to flow to the loader assembly 300.

In one illustrative embodiment, the compensator valves 116 and 118 comprise piloted spool-type logic elements, Model No. EP20-S35, available from HydraForce of Lincolnshire, Ill. It should be appreciated that other suitable valves may be readily substituted therefor.

As shown in FIG. 4, the steering assembly 200 receives hydraulic fluid through line 202 from manifold 114. Steering assembly 200 may include an orbital steering valve 204 which is configured to be actuated by a manually operated steering wheel 206. Steering assembly 200 also may include a joystick steering control valve 208 which is configured to be actuated by a manually operated joystick 210. As is known, to turn the loader 10 to the right, the operator rotates steering wheel 206 in a clockwise direction or moves joystick 210 in a right direction. Similarly, to turn the loader 10 to the left, the operator rotates steering wheel 206 in a counterclockwise direction or moves joystick 210 in a left direction. More particularly, movement of the steering wheel 206 or joystick 210 actuates the valves 204 and 208, respectively, for moving left and right hydraulic steering actuators 212 and 214.

Both orbital steering valve 204 and joystick steering control valve 208 are known in the art. For example, orbital steering valve 204 includes a fluid meter or gerotor 216 and valve structure or spool 218. The gerotor 216 and spool 218 cooperate to control the direction and flow rate of hydraulic fluid provided to left and right hydraulic steering actuators 212 and 214, respectively, for steering the loader 10. Crossover relief valves 220 are located between the valve structure 218 and the actuators 212 and 214 for providing pressure relief for the system 100.

Illustratively, the actuators 212 and 214 each comprise a hydraulic cylinder having a movable piston 223 coupled to a rod 225. The fluid output of the steering valves 204 and 208 is directed to the ends of hydraulic cylinders so as to control the movement of the front portion 18 relative to the rear portion 20 of the frame 12.

Illustrative steering control valves are detailed in U.S. Pat. No. 4,781,219 to Haarstad et al. and U.S. Pat. No. 4,809,586 to Gage et al., the disclosures of which are expressly incorporated by reference herein.

A steering priority valve, illustratively pressure regulating valve 270, is fluidly coupled to the line 202 intermediate the manifold 114 and the steering assembly 200. Valve 270 illustratively comprises a three-way, two-position proportional valve including a spool 271 and configured to provide fluid communication between line 272 and line 202. Valve 270, when not in a fully open position, creates a restriction thereby causing a pressure drop thereacross. The pressure drop is based upon the relative position of the spool 271 of the valve 270. Sense lines 274 and 276 are coupled to opposite ports of the valve 270 and control the relative position of the spool 271, thereby regulating pressure.

As shown in FIG. 3, an auxiliary steering pump 250 may by fluidly coupled to the steering assembly 200 through fluid line 252. The pump 250 provides backup hydraulic pressure if priority pumps 102 and 104 are not functioning properly.

Load sense lines 222 and 224 fluidly connect the steering assembly 200 to the hydraulic system manifold 114. More particularly, the lines 222 and 224 couple the orbital steering valve 204 and the joystick steering control valve 208, respectively, to a comparator 226. The comparator 226 receives pressure inputs from lines 222 and 224 and transmits a pressure output to line 228 equal to the larger input from lines 222 and 224. Line 228 transmits the signal to inlet ports of compensator valves 116 and 118. In other words, the load signal lines 222, 224, and 228 are capable of transmitting pressure signals which are generated by loads acting on the hydraulic cylinders 212 and 214 to the compensator valves 116 and 118. In order to ensure that the pressure sensed by the compensator valves 116 and 118 is the greater of the two fluid pressures contained in the orbital steering valve 204 and the joystick steering control valve 208, the comparator 226 is situated at an intersection point of the lines 222 and 224.

With reference to FIG. 5, hydraulic fluid is supplied to the loader assembly 300 through hydraulic line 302, which is fluidly coupled to loader pump 106. Hydraulic fluid is selectively supplied to the loader assembly 300 through hydraulic line 304, which is coupled to priority pumps 102 and 104. Loader assembly 300 includes a loader control valve 306 having three pilot controlled directional control spools 308, 310, and 312 and associated pressure relief valves 314, 316, and 318. The directional control spools 308, 310, and 312 control the movement of the boom hydraulic actuators 28, the bucket hydraulic actuators 32, and an auxiliary hydraulic actuator (not shown). Illustratively, auxiliary actuator may be used to manipulate hydraulically operated accessories, such as a side dump bucket or a clam bucket. All of the control spools 308, 310, and 312 are positioned by a pilot controller 500 as detailed herein.

Control spools 310 and 312 are of conventional design and illustratively comprise three-position directional control spools. Control spool 308 is of a similar structure as spools 310 and 312 but is provided with a fourth position, which is utilized to place the boom hydraulic actuators 28 into float configurations. In float configurations, the weight of the load supported by the boom 26 will lower the boom 26 by coupling both sides of the boom hydraulic actuator to reservoir 108.

Figure 2:
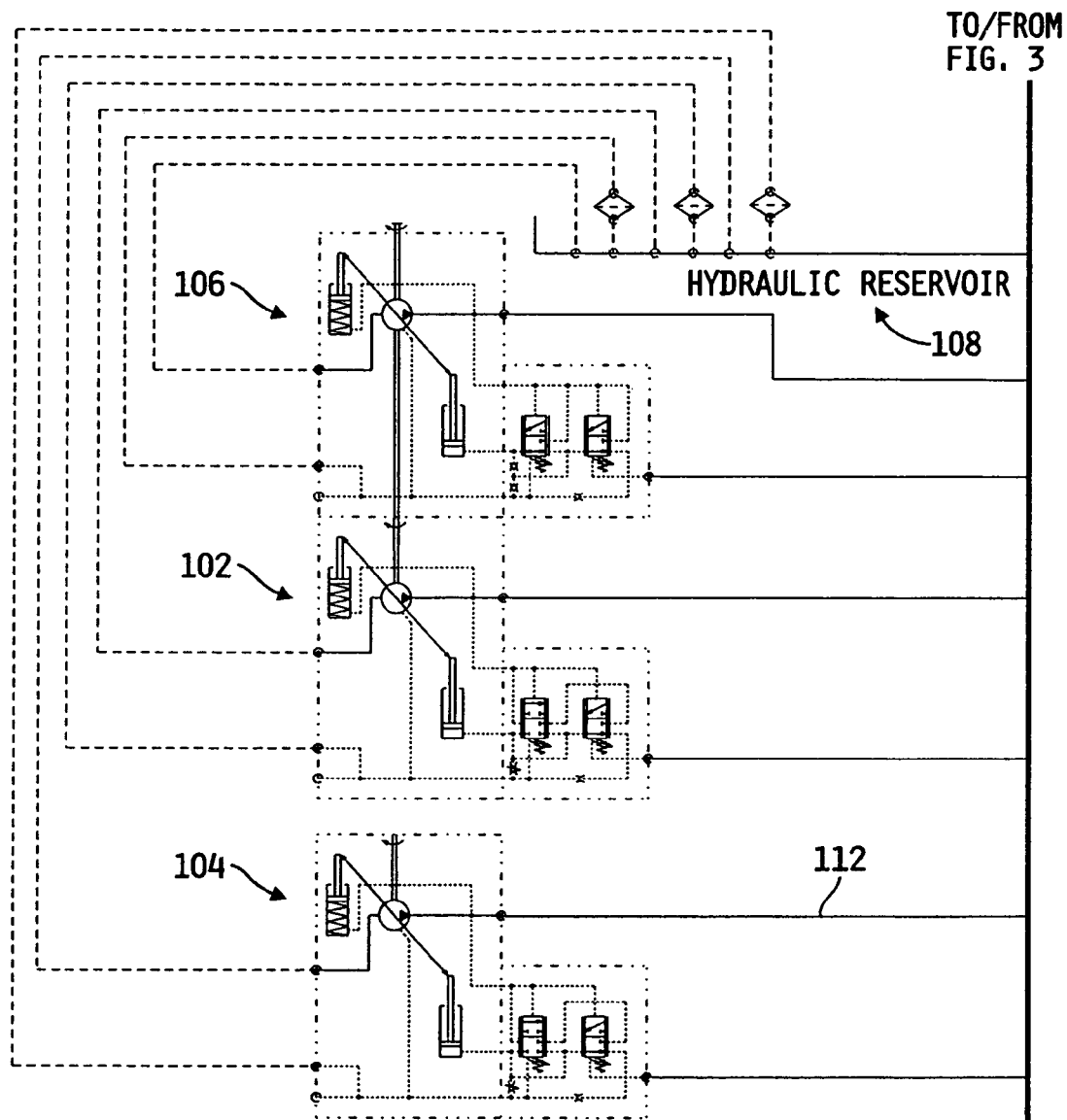
FIG. 2 is a schematic view of a portion of a hydraulic control system of the vehicle of FIG. 1, showing pumps drawing hydraulic fluid from a reservoir.

With further reference to FIG. 5, pilot controller 500 is also of conventional design and is configured to hydraulically control the positioning of control spools 308, 310, and 312 of loader assembly 300. The controller 500 provides hydraulic inputs to opposite ends of the valve spools 308, 310, and 312 for hydraulic shifting of the spools. The controller 500 is fluidly coupled to a pilot enable accumulator 502 and pressure regulating assembly 504 through a fluid line 506 (FIG. 2). Pilot controller 500 includes three valve sets 508, 510, and 512 which are fluidly coupled to spools 308, 310, and 312, respectively.

More particularly, valve set 508 is configured to lower and raise the boom 26 by controlling spool 308. Similarly, valve set 510 is configured to dump and curl the bucket 30 by controlling spool 310. Valve set 512 is configured to control the positioning of control spool 312, which controls the flow of hydraulic fluid to auxiliary actuator. As is known, the positioning of the valve sets 508, 510, and 512 is manually controlled by the operator through operation of conventional joysticks or levers 514, 516, and 518.

The operation of the hydraulic system 100 will now be described in connection with loader 10. While various illustrative pressure values will be assigned to certain components of the system 100, it should be appreciated that these are for illustration only and do not limit the scope of the invention.

Starting from a condition wherein the engine 34 of the loader 10 is not running, the pumps 102, 104, and 106 will not be operating. At this time, the steering valves 204 and 208 will be in their respective neutral positions, the hydraulic cylinders 28, 32, 212 and 214 will be depressurized, the compensator valves 116 and 118 will be closed, and the regulating valve 270 will be in its fully open position. As soon as the operator starts the engine 34, the pumps 102, 104, and 106 will start to pump fluid through the supply lines 110 and 112 to the compensator valves 116 and 118. Since the compensator valves 116 and 118 are in their closed positions, fluid flow will be blocked and the fluid pressure will rise within the supply lines 110 and 112. As the pressure rises and reaches about 200 psi, which represents the force needed to compress the spring 122, the compensator valves 116 and 118 will shift to their open positions. In their open positions, the compensator valves 116 and 118 fluidly connect supply lines 110 and 112 to line 304 and hence, the loader assembly 300. Assuming that the valves of the steering assembly 200 and the loader assembly 300 are in their neutral positions, no fluid will be able to pass therethrough. The priority pumps 102 and 104 will continue operating to build pressure until it reaches a value of about 826 psi, which represents the standby setting of the pumps 102 and 104. At this point, the pressure difference across the pumps 102 and 104 will be balanced such that the pressure developed by the pumps 102 and 104 will rise no higher. The hydraulic system 100 at this point is in a standby mode of operation.

Should the operator activate the steering assembly 200 through operation of the steering wheel 206, which moves the orbital steering valve 204, or the joystick 210, which moves the joystick steering control valve 208, fluid will be directed to the steering cylinders 212 and 214. As this happens, the supply lines 110 and 112 are fluidly connected to fluid line 202 for supplying fluid to valves 204 and 208. Load sense signals are transmitted to comparator 226 from the valves 204 and 208 through load sense lines 222 and 224, wherein the pressure signal with the greater value is transmitted to compensator valves 116 and 118 through line 228. If hypothetically, for example, it requires 1000 psi to move the pistons 223 within the hydraulic actuators 212 and 214 based upon load conditions, then pressure from the pumps 102 and 104 would increase from the standby pressure of 826 psi to the hypothetical 1000 psi for moving the actuators 212 and 214. The compensator valves 116 and 118 remain in their closed positions until the pressure drop through the steering assembly 200 exceeds 200 psi. At that point, the pressure in lines 110 and 112 exceeds the combination of 200 psi pressure from the spring 122 and the fluid pressure in load sense line 228. With the pressure at 1000 psi, the pumps 102 and 104 will continue to supply the pressurized fluid to the actuators 212 and 214 as long as the operator is manipulating the steering wheel 206 or joystick 210. Once the operator ceases, the pressure in line 228 returns to zero, thereby opening valves 116 and 118. The pumps 102 and 104 sense the pressure variation between fluid in lines 110 and 112 and line 228 and destroke back to the standby condition of 826 psi.

During an illustrative priority flow mode of operation, the hydraulic circuit 100 will prioritize the flow of fluid to the steering assembly 200 regardless of the fluid required by the loader assembly 300. Starting from a position wherein the compensator valves 114 and 116 are open, fluid from the pumps 102 and 104 is directed to the loader assembly 300 through the line 304. For illustrative purposes, it is assumed that the pumps 102 and 104 are operating to produce fluid at 826 psi to satisfy a 300 psi load requirement of the accessory circuit 300. At this time, the operator desires to turn the wheels 16 by operating either the orbital steering valve 204 or the joystick steering control valve 208 in the manner detailed herein. Operation of the respective valves 204 and 208 results in the fluid pressure of the supply lines 110 and 112 being coupled to the steering actuators 216 and 218. Assuming that the steering actuators 212 and 214 require 800 psi of pressure to operate based upon load conditions, it is not possible for the 826 psi in supply lines 110 and 112 to operate both the steering assembly 200 and the loader assembly 300. More particularly, the fluid would simply follow the path of least resistance to the loader assembly 300 instead of to the steering assembly 200.

The load sense pressure in lines 222 and 224, passes through comparator 226 to load sense line 228. If the pressure of fluid in sense line 228 together with the pressure from spring 122 is greater than the pressure in lines 110 and 112, then the compensator valves 116 and 118 will begin to close. In this illustrative case, the pressure in line 228 equals 826 psi and the spring produces a pressure of 200 psi, such that the resulting pressure of 1026 psi exceeds the 826 psi in line 112, and the valves 116 and 118 will shift to their closed positions. The resulting flow of pressurized fluid of 826 psi to the steering cylinders 212 and 214 is sufficient to move the pistons 222.

In a another illustrative priority flow mode of operation, the compensator valves 114 and 116 are initially open, such that flow from the pumps 102 and 104 is directed to the loader assembly 300 through the line 304. It is assumed that the pumps 102 and 104 are operating to produce 850 psi to satisfy an 850 psi load requirement of the accessory circuit 300. At this time, the operator desires to turn the wheels 16 by operating either the orbital steering valve 204 or the joystick steering control valve 208 in the manner detailed herein. Operation of the respective valves 204 and 208 results in the fluid pressure of the supply lines 110 and 112 being coupled to the steering actuators 216 and 218. Assuming that the actuators requires 900 psi of pressure to operate based upon load conditions, it is not possible for the 850 psi in supply lines 110 and 112 to operate the steering assembly 200. Pressure in line 228 combines with the pressure from the spring 122 to cause the compensator valves 116 and 118 to move to their closed positions. This valve closing results in restrictions, which causes the pressure in lines 110 and 112 to increase. When the pressure reaches approximately 900 psi, fluid will start flowing to the actuators 212 and 214 for moving the pistons 222.

Once the operator stops manual input to the valves 204 and 208, these valves 204 and 208 move to their neutral positions and the pressure within load sense lines 222 and 224 will drop to essentially zero. This drop in pressure will cause the compensator valves 116 and 118 to return to their open positions, permitting full flow, at the assumed load requirement of 850 psi, to the loader assembly 300. In the meantime, the pressure produced by the pumps 102 and 104 is reduced from 900 psi to 850 psi because the restriction in the compensator valves 116 and 118 have been essentially eliminated.

The hydraulic system 100 is configured to provide priority of pressurized fluid flow to the steering assembly 200 regardless of output from pumps 102, 104, and 106 as a result of speed of the driving engine 34. Moreover, the manifold 114 is configured to direct fluid from pumps 102 and 104 to the steering system 200 when required to ensure consistent steering performance, regardless of speed of the engine 34. More particularly, the compensator valves 116 and 118 are configured to maintain fluid to the steering assembly 200 by preventing fluid flow from the priority pumps 102 and 104 to the loader assembly 300 if the pressure from the pumps 102 and 104 is below a predetermined value. Illustratively, the predetermined value is at least 200 psi above the greater of the load sense pressures in lines 222 and 224 from the valves 204 and 208. The parallel circuit arrangement of the compensator valves 116 and 118 facilitates adequate flow therethrough and may be easily expanded by providing additional compensator valves in parallel.

Although the invention has been described in detail with reference to certain preferred embodiments, variations and modifications exist within the spirit and scope of the invention as described and defined in the following claims.

The invention claimed is:

1. A vehicle comprising:
   an articulated frame having a front portion and a rear portion;
   a plurality of traction devices configured to propel the frame on the ground;
   a steering assembly including a hydraulic steering actuator operably coupled to the front portion and the rear portion of the frame;
   a loader assembly including a hydraulic loader actuator supported by the frame;
   a priority pump in fluid communication with the steering assembly;
   a first compensator valve in fluid communication with the priority pump;
   a second compensator valve in fluid communication with the priority pump and coupled in parallel with the first compensator valve; and
   wherein the first compensator valve and the second compensator valve are configured to provide fluid flow from the priority pump to the loader assembly only when the pressure of the fluid discharged from the priority pump exceeds a predetermined value.

2. The vehicle of claim 1, further comprising a loader pump coupled to the loader assembly independently from the priority pump.

3. The vehicle of claim 1, wherein the first and second compensator valves comprise two-way, two-position valves configured to provide selective restrictions to fluid discharged from the priority pump.

4. The vehicle of claim 1, further comprising a load signal line fluidly coupled to the steering assembly and configured to transmit load pressure signals, generated by loads acting on the hydraulic steering actuator, to the first and second compensator valves.

5. The vehicle of claim 4, wherein the first and second compensator valves are configured to sense a pressure differential between the fluid discharged from the priority pump and the fluid present in the load signal line, and to control fluid flow to the loader assembly in response to the pressure differential.

6. The vehicle of claim 5, wherein the predetermined value of the fluid discharged from the priority pump equals the pressure of the fluid present in the load signal line in addition to the pressure required to overcome a biasing force.

7. The vehicle of claim 1, wherein the steering assembly includes a pressure regulating valve positioned intermediate the first and second compensator valves and the steering actuator.

8. The vehicle of claim 7, wherein the pressure regulating valve comprises a three-way, two-position proportional valve.

9. The vehicle of claim 1, further comprising a third compensator valve in fluid communication with the priority pump, and coupled in parallel with the first compensator valve and the second compensator valve.

10. A vehicle comprising:
    an articulated frame having a front portion and a rear portion;

a plurality of traction devices configured to propel the frame on the ground; and
a control system including
   a pump,
   at least one hydraulic steering actuator operably coupled to the front portion and the rear portion of the frame,
   a steering valve configured to place the at least one hydraulic steering actuator in fluid communication with the pump,
   a first compensator valve configured to control the flow of fluid from the pump to the steering valve by providing priority to the flow of fluid to the at least one hydraulic steering actuator,
   a second compensator valve in fluid communication with the pump and coupled in parallel with the first compensator valve, and
   a pressure regulating valve positioned intermediate the first compensator valve and the steering valve, the pressure regulating valve configured to regulate the pressure of fluid supplied to the steering valve.

11. The vehicle of claim 10, further comprising at least one hydraulic loader actuator fluidly coupled to the first compensator valve, wherein the first compensator valve is configured to provide fluid flow from the pump to the at least one hydraulic loader actuator only when fluid pressure from the pump exceeds a predetermined value.

12. The vehicle of claim 11, further comprising a load signal line fluidly coupled to the steering valve and configured to transmit load pressure signals, generated by loads acting on the at least one hydraulic steering actuator, to the first compensator valve.

13. The vehicle of claim 12, wherein the first compensator valve is configured to sense a pressure differential between the fluid discharged from the pump and the fluid present in the load signal line, and to control fluid flow to the steering valve in response to the pressure differential.

14. The vehicle of claim 13, wherein the predetermined value of the fluid discharged from the pump equals the pressure of the fluid present in the load signal line in addition to the pressure required to overcome a biasing force.

15. The vehicle of claim 10, wherein the first compensator valves comprises a two way, two-position valve configured to provide selective restriction to fluid discharged from the pump.

16. The vehicle of claim 10, wherein the pressure regulating valve comprises a three-way, two-position proportional valve.

17. A vehicle comprising:
an articulated frame having a front portion and a rear portion;
a plurality of traction devices configured to propel the frame on the ground;
a steering assembly including a hydraulic steering actuator operably coupled to the front portion and the rear portion of the frame, and a steering valve fluidly coupled to the steering actuator;
a loader assembly including a hydraulic loader actuator supported by the frame, and a loader valve fluidly coupled to the loader actuator;
a priority pump in fluid communication with the steering assembly;
a first compensator valve in fluid communication with the priority pump, the steering valve, and the loader valve;
a second compensator valve in fluid communication with the priority pump, the steering valve, and the loader valve, the second compensator valve being coupled in parallel with the first compensator valve;
a pressure regulating valve positioned intermediate the first and second compensator valves and the steering valve, the pressure regulating valve configured to regulate the pressure of fluid supplied to the steering valve;
a load signal line fluidly coupled to the steering valve and configured to transmit load pressure signals, generated by loads acting on the steering actuator, to the first and second compensator valves; and
wherein the first and second compensator valves are configured to sense a pressure differential between the fluid discharged from the priority pump and the fluid present in the load signal line, and to control fluid flow to the loader valve in response to the pressure differential.

18. The vehicle of claim 17, further comprising a loader pump fluidly coupled to the loader assembly independently from the priority pump.

19. The vehicle of claim 17, wherein the first and second compensator valves comprise two-way, two-position valves configured to provide selective restrictions to fluid discharged from the priority pump.

20. The vehicle of claim 17, wherein the pressure regulating valve comprises a three-way, two-position proportional valve.

21. A vehicle comprising:
an articulated frame having a front portion and a rear portion;
a plurality of traction devices configured to propel the frame on the ground; and
a control system including
   a pump,
   at least one hydraulic steering actuator operably coupled to the front portion and the rear portion of the frame,
   a steering valve configured to place the at least one hydraulic steering actuator in fluid communication with the pump,
   a first compensator valve configured to control the flow of fluid from the pump to the steering valve by providing priority to the flow of fluid to the at least one hydraulic steering actuator,
   at least one hydraulic loader actuator fluidly coupled to the first compensator valve, wherein the first compensator valve is configured to provide fluid flow from the pump to the at least one hydraulic loader actuator only when fluid pressure from the pump exceeds a predetermined value,
   a load signal line fluidly coupled to the steering valve and configured to transmit load pressure signals, generated by loads acting on the at least one hydraulic steering actuator, to the first compensator valve, wherein the first compensator valve is configured to sense a pressure differential between the fluid discharged from the pump and the fluid present in the load signal line, and to control fluid flow to the steering valve in response to the pressure differential,
   a second compensator valve in fluid communication with the pump and coupled in parallel with the first compensator valve,
   a pressure regulating valve positioned intermediate the first compensator valve and the steering valve, the pressure regulating valve configured to regulate the pressure of fluid supplied to the steering valve, and
   wherein the predetermined value of the fluid discharged from the pump equals the pressure of the fluid present in the load signal line in addition to the pressure required to overcome a biasing force.

* * * * *

UNITED STATES PATENT AND TRADEMARK OFFICE
CERTIFICATE OF CORRECTION

| | |
|---|---|
| PATENT NO. | : 7,597,168 B2 |
| APPLICATION NO. | : 11/438828 |
| DATED | : October 6, 2009 |
| INVENTOR(S) | : Anderson et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-eighth Day of September, 2010

David J. Kappos
*Director of the United States Patent and Trademark Office*